United States Patent [19]

Irie et al.

[11] Patent Number: 5,275,773
[45] Date of Patent: Jan. 4, 1994

[54] METHOD FOR PRODUCTION OF PARTICULATE HYDRATED GEL POLYMER AND ABSORBENT RESIN

[75] Inventors: Yoshio Irie; Takumi Hatsuda, both of Himeji; Koichi Yonemura, Suita, all of Japan

[73] Assignee: Nippon Shokubai Co., Ltd., Osaka, Japan

[21] Appl. No.: 827,444

[22] Filed: Jan. 29, 1992

[30] Foreign Application Priority Data

Feb. 1, 1991 [JP] Japan .................... 3-12324

[51] Int. Cl.$^5$ ............................. C08F 220/06
[52] U.S. Cl. ................ 264/141; 264/211.2; 264/331.18; 524/916
[58] Field of Search ........... 264/140, 141, 184, 177.19, 264/211.2, 331.18, 211.24; 524/916

[56] References Cited

U.S. PATENT DOCUMENTS

| | | | |
|---|---|---|---|
| 3,905,122 | 9/1975 | Ohshima et al. | 34/17 |
| 3,966,679 | 6/1976 | Gross | 264/140 |
| 3,996,411 | 12/1976 | Ohshima et al. | 526/88 |
| 4,076,663 | 2/1978 | Masuda et al. | 604/368 |
| 4,113,688 | 9/1978 | Pearson | 523/324 |
| 4,286,082 | 8/1981 | Tsubakimoto et al. | 526/240 |
| 4,358,550 | 11/1982 | Jacono et al. | 264/141 |
| 4,367,323 | 1/1983 | Kitamura et al. | 526/201 |
| 4,446,261 | 5/1984 | Yamasaki et al. | 524/40 |
| 4,625,001 | 11/1986 | Tsubakimoto et al. | 526/88 |
| 4,654,039 | 3/1987 | Brandt et al. | 604/368 |
| 4,690,788 | 9/1987 | Yada et al. | 524/916 |
| 4,904,715 | 2/1990 | Hunter et al. | 524/916 |
| 4,985,514 | 1/1991 | Kimura et al. | 526/88 |
| 5,147,956 | 9/1992 | Allen | 524/916 |

FOREIGN PATENT DOCUMENTS

| | | |
|---|---|---|
| 0289338 | 11/1988 | European Pat. Off. |
| 47-42466 | 10/1972 | Japan |
| 50-136348 | 10/1975 | Japan |
| 54-106568 | 8/1979 | Japan |
| 54-32176 | 10/1979 | Japan |
| 56-161408 | 12/1981 | Japan |
| 57-34101 | 2/1982 | Japan |
| 57-94011 | 6/1982 | Japan |
| 57-158209 | 9/1982 | Japan |
| 57-198714 | 12/1982 | Japan |
| 58-49714 | 3/1983 | Japan |
| 59-30826 | 2/1984 | Japan |
| 59-119172 | 7/1984 | Japan |
| 59-37003 | 9/1984 | Japan |
| 61-110511 | 5/1986 | Japan |
| 61-36763 | 8/1986 | Japan |
| 1-144404 | 6/1989 | Japan |
| 2-19122 | 4/1990 | Japan |
| 2139632 | 11/1984 | United Kingdom |

*Primary Examiner*—Jay H. Woo
*Assistant Examiner*—Robert B. Davis
*Attorney, Agent, or Firm*—Burns, Doane, Swecker & Mathis

[57] ABSTRACT

A method for the production of a particulate hydrated gel polymer, which includes heating a hydrated gel polymer possessed of a cross-linked structure to a temperature in the range of from 45° to 90° C. and extruding the resultant hot hydrated gel polymer through a perforated plate containing holes of a diameter in the range of from 6.5 to 18 mm and an absorbent resin which includes drying the resultant particulate hydrated gel polymer.

14 Claims, 1 Drawing Sheet

METHOD FOR PRODUCTION OF PARTICULATE HYDRATED GEL POLYMER AND ABSORBENT RESIN

BACKGROUND OF THE INVENTION

1. Field of the Invention

This invention relates to a method for the production of a particulate hydrated gel polymer and an absorbent resin. More particularly, it relates to a method for the production of a particulate hydrated gel polymer, characterized by extruding a hydrated gel polymer possessed of a cross-linked structure through a perforated plate containing holes of a specific diameter at a specific temperature. It further relates to a method for the production of an absorbent resin by drying the particulate hydrated gel polymer described above and optionally disintegrating and/or pulverizing the dried polymer.

2. Description of the Prior Art

The absorbent resins heretofore known to the art include cross-linked polyacrylates, saponified acrylic ester-vinyl acetate copolymers, modified cross-linked polyvinyl alcohols, cross-linked isobutylene-maleic anhydride copolymers, and starch-acrylic acid graft polymer, for example. They have found extensive utility for sanitary absorbents such as sanitary napkins and disposable diapers and for water-retaining agents and dewatering agents in the agricultural and horticultural field and the civil engineering field.

As methods for the production of these absorbent resins, the methods disclosed in JP-A-56-161,408, JP-A-57-94,011, JP-A-57-158,209, and JP-A-198,714 have been known as resorting to the technique of reversed-phase suspension polymerization and those disclosed in JP-A-57-34,101, JP-A-48,42,466, JP-A-58-49,714, JP-B-59-37,003, U.S. Pat. Nos. 4,286,082, and 4,625,001 have been known as resorting to the technique of aqueous solution polymerization.

The methods by the reversed-phase suspension polymerization, because of the inevitable use of an organic solvent, have the possibility of not merely jeopardizing the shop environment but also threatening a fire or an explosion and dictate adoption of a countermeasure to preclude such adverse phenomena and, as a natural consequence, boost the cost of operation inclusive of the expense for the organic solvent and the expense for the removal of used organic solvent. Moreover, since the organic solvent persists in the finished product, though in a very minute amount, an effort to obtain perfect removal of the remaining organic solvent further adds to the cost. The absorbent resin which is produced by the methods resorting to the reversed-phase suspension polymerization comprises spherical particles of a small diameter. When this resin is used such as in a disposable diaper, for example, it has a problem of inconvenience of handling because the spherical particles are not retained fast in a fibrous absorption core such as of pulp but suffered to spill out.

In contrast, the methods by the aqueous solution polymerization are free from the problems mentioned above. The methods disclosed in JP-A-57-34,101 and U.S. Pat. No. 4,625,001 are directed to producing a cross-linked polymer by placing in a vessel provided with stirring blades the aqueous solution of a monomer destined to form a cross-linked structure and mature into a hydrated gel polymer in the process of aqueous solution polymerization and a polymerization initiator, initiating polymerization of the monomer therein, and finely dividing a hydrated gel polymer being formed in consequence of the progress of the polymerization with the shear force of the stirring blades generated by the rotation of the stirring blades and meanwhile continuing radical aqueous solution polymerization. These methods of production have the advantage of not merely operating ideally but also producing a finely divided hydrated gel polymer possessed of a cross-linked structure in the molecular unit thereof in a high yield. Even these methods, however, have sometimes disadvantage of producing only in a low yield an absorbent resin which has a high absorption ratio and a small water-soluble component.

It has been well known to persons of ordinary skill in the art that the absorption ratio is increased by lowering the cross-link density. It has been also known that the water-soluble component in the absorbent resin is large when the absorbent resin is produced by an operation involving a work of lowering the cross-link density. The water-soluble component, when the absorbent resin forms a hydrogel texture on contact with a liquid such as water, urine, or body fluid which is given to be absorbed, exudes from the affected area. The water-soluble component which is thus extracted by the liquid subjected to absorption not only lowers the absorption ratio but also aggravates the deterioration of the absorbent resin. This exudation entails the disadvantage of imparting a ropy unpleasant texture to the absorbent resin and contaminating the liquid under treatment.

A desire has been expressed, therefore, for a method which is capable of producing an absorbent resin enjoying a high absorption ratio and having only a small water-soluble component.

U.S. Pat. No. 4,654,039 and JP-A-1-144,404 disclose methods for producing an absorbent resin having a high absorption ratio and only a small water-soluble component by subjecting a monomer of a free acid type or a monomer having a specific neutralization ratio to aqueous solution polymerization. These methods are disadvantageous in necessitating an extra aftertreatment for neutralization, operating with complexity and poor efficiency, and imposing a restriction on the conditions of polymerization.

The hydrated gel polymer which is obtained by polymerization is generally pulverized after the step of drying and is consequently marketed in the form of a powdery product. Heretofore, for the purpose of ensuring efficient drying of this hydrated gel polymer, efforts have been directed to enlarging the surface area of the hydrated gel polymer to the fullest possible extent. Methods for crushing the hydrated gel polymer by extrusion through a perforated plate (JP-B-54-32,176, JP-A-50-136,348, etc.), for example, have been known. These conventional methods have been unable to produce a particulate hydrated gel polymer because the minute hydrated gel polymer particles resulting from the extrusion are suffered to agglomerate again and form cords.

Methods which rely on the incorporation of such additives as a lubricant for preventing the agglomeration of the pulverized hydrated gel polymer during the extrusion of the hydrated gel polymer through a perforated plate (JP-A-59-30,826, JP-A-59-119,172, etc.) have been known to the art. These methods, however, have at times occasioned the additive persisting in the polymer to exert an adverse effect on the quality of the product. A method which effects the pulverization of a water-soluble hydrated gel polymer possessed of no cross-linked structure by extruding this polymer through a perforated plate at a specific temperature (JP-A-54-106,568) has been known to the art. This method has entailed a problem of poor productivity because it requires to decrease the diameter of holes in the perforated plate for the purpose of enhancing the efficiency of drying of the hydrated gel polymer. In this method, the pulverization has produced no discernible improvement in physical properties.

No method has yet been established for producing a particulate hydrated gel polymer and an absorbent resin having a high absorption ratio and a small water-soluble component in high yields by a simple process without requiring any special device. A method for producing in a high yield a particulate hydrated gel polymer containing no additives such as lubricant, succumbing to no excess pulverization, and allowing a highly efficient drying remains yet to be established.

An object of this invention, therefore, is to provide a method for the production of a particulate hydrated gel polymer having a high absorption ratio and a small water-soluble component and an absorbent resin.

Another object of this invention is to provide a method for producing in high yields a particulate hydrated gel polymer and an absorbent resin both having a high absorption ratio and a small water-soluble component by a simple process without requiring any special device.

Still another object of this invention is to provide a method for producing in a high yield a particulate hydrated gel polymer containing no additives such as lubricant and succumbing to no excessive pulverization.

SUMMARY OF THE INVENTION

In view of the true state of affairs described above, the inventors have continued a diligent study in search of a method for the production of a particulate hydrated gel polymer and an absorbent resin. As a result, this invention has been perfected.

The objects of this invention are accomplished by a method for the production of a particulate hydrated gel polymer which comprises heating a hydrated gel polymer possessed of a cross-linked structure to a temperature in the range of from 45° to 90° C. and extruding the heated hydrated gel polymer through a perforated plate possessed of holes of a diameter in the range of from 6.5 to 18 mm. The objects of this invention are also accomplished by a method for the production of an absorbent resin which comprises heating a hydrated gel polymer possessed of a cross-linked structure to a temperature in the range of from 45° to 90° C. extruding the heated hydrated gel polymer through a perforated plate possessed of holes of a diameter in the range of from 6.5 to 18 mm, and drying the particulate hydrated gel polymer. The particulate hydrated gel polymer is optionally disintegrated or pulverized after drying.

As clearly demonstrated by the working examples and controls described below, the method of this invention allows production of a particulate hydrated gel polymer and an absorbent resin both having a high absorption ratio and a small water-soluble component. Moreover, this method affords these products in high yields by a simple process without requiring any special device.

When the particulate hydrated gel polymer of this invention is dried, it gives birth to a uniform dried product. From this dried product, an absorbent resin having a small fine dust content is obtained by pulverizing the dried product under mild conditions such as the action of a pulverizing device like a roll mill.

The particulate hydrated gel polymer of this invention contains substantially no coarse gel particles. Particularly when the hydrated gel polymer used as a raw material is a particulate hydrated gel polymer having an average particle diameter in the range of from 0.5 to 3 mm, the produced particulate gel polymer enjoys a narrow particle size distribution. The drying, therefore, is attained with notably improved efficiency. Particularly when the drying is carried out by the method of drying disclosed in JP-A-64-26,604, an absorbent resin having a notably small residual monomer content is obtained in a high yield.

EXPLANATION OF THE PREFERRED EMBODIMENT

Figure 1:
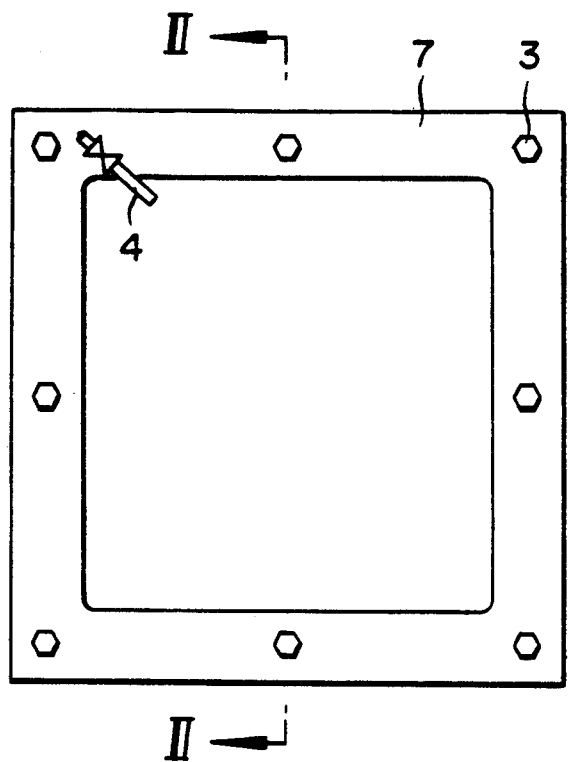
FIG. 1 is a front view illustrating schematically a polymerization apparatus used in working examples.

The hydrated gel polymer for use in this invention is obtained by polymerizing a monomer component which, on aqueous solution polymerization, forms a cross-linked structure and matures into a hydrated gel polymer. For effective use in this invention, therefore, the hydrated gel polymer must be possessed of a cross-linked structure.

The hydrated gel polymer of this description is a cross-linked hydrated gel polymer which, as disclosed in JP-B-61-36,763 and JP-B-2-19,122, has a monomer compostion (i) containing at least one monomer (A) selected from the group consisting of (meth)acrylic acids, alkali metal salts and ammonium salts thereof, and (meth)acrylamides as main component and a cross-linkable monomer (B) having at least two polymerizable double bonds in the molecular unit thereof and is produced by polymerizing a monomer composition (I) and from 0.001 to 50 mol %, preferably from 0.01 to 10 mol %, based on the amount of the monomer composition (I) of the cross-linkable monomer (B).

The water content of the hydrated gel polymer to be used in this invention is not particularly limited but is only required to be enough for the polymer to assume the form of a hydrated gel. Generally, this water content is in the range of from 40 to 90% by weight, preferably from 50 to 80% by weight. The term "water content" of the hydrated gel polymer as used in this invention means the proportion of the amount of the water contained to the total amount of the hydrated gel polymer, reported in % by weight.

The individual particles of the hydrated gel polymer are only required to have a size and a shape such that they fit the treatment with an extruding device which will be specifically described below. Particularly, the finely divided hydrated gel polymer which is obtained as by the method disclosed in JP-A-57-34,101 proves preferable among other hydrated gel polymers. The particulate hydrated gel polymer is preferable to have an average particle diameter in the range of from 0.5 to 3 mm, preferably from 0.5 to 2 mm.

The particulate hydrated gel polymer possessed of a highly uniform particle size can be obtained by performing the method of this invention on a particulate hydrated gel polymer having an average particle diameter in the range of from 0.5 to 3 mm. When this particulate hydrated gel is dried and pulverized, it dries with high efficiency and pulverizes with the emission of fine dust repressed to a very small amount and gives birth to an absorbent resin excellent in quality.

In this invention, the hydrated gel polymer is pulverized into minute particles by being extruded through a perforated plate. As the mechanism for accomplishing this extrusion, a screw type device or a roll type device which is capable of advancing the hydrated gel polymer from the hopper to the perforated plate by means of pressure can be used. The screw type extruding device is only required to be possessed of a screw adapted to rotate inside a cylinder and needs not choose between the monoaxial type and the multiaxial type. The screw type extruding device which is generally adopted for extruding rubber, plastic, and other similar substances or the screw type extruding device which is used as a pulverizer can be used safely herein.

The perforated plate for effective use in this invention must contain holes of a diameter in the range of from 6.5 to 18 mm, preferably from 8 to 15 mm. If the diameter of the holes is less than 6.5 mm, the conditions for crushing are so harsh as to increase the friction between the wall surface of the extruding device and the hydrated gel polymer, impairing the productivity of the device, and degrading the physical properties of the hydrated gel polymer itself as by the heat of friction and the physical force (shear force). Thus, the particulate hydrated gel polymer and the absorbent resin having a high absorption ratio and a small water-soluble component as aimed at by this invention cannot be obtained. Further, the hydrated gel polymer is crushed too finely to produce a hydrated gel polymer in a particulate form as aimed at. The practice of extruding the hydrated gel polymer through a perforated plate for the purpose of enhancing the efficiency of the drying and pulverizing operation in the next step has prevailed to date. It has been held that for enhancing this efficiency to a high level, the diameter of the holes in the perforated plate should be decreased preferably to below 5 mm. The extrusion, therefore, has so poor productivity as to necessitate use of a huge device for the purpose of increasing the amount of the product to a desired level. This invention has succeeded in producing in a high yield the particulate hydrated gel polymer having a high absorption ratio and a small water-soluble component by setting the lower limit of the diameter of such holes in the perforated plate at 6.5 mm, completely contrary to the rule derivable from the conventional technique.

If this diameter of holes exceeds 18 mm, the particulate hydrated gel polymer to be produced lacks uniformity of the particle size and acquires a high absorption ratio and a small water-soluble component only with difficulty.

The opening ratio of the perforated plate to be used in this invention is desired to exceed 25%. If the opening ratio is less than 25%, the resistance offered by the perforated plate to the hydrated gel polymer being extruded therethrough is increased so much as to degrade the productivity of the operation of extrusion. Owing to the difficulty of the extrusion, the hydrated gel polymer while in transit in the part of the extruding device serving to advance the polymer to the perforated plate under pressure is crushed unduly finely possibly to the extent of rendering it difficult to obtain a particulate hydrated gel polymer having a high absorption ratio and a small water-soluble component. More preferable opening ratio is 30 to 90%. The term "opening ratio" as used herein means the ratio of the total surface area of the holes to the overall surface area of the perforated plate.

There are times when the perforated plate is desired to be provided with a cutter which is adapted to move while keeping substantial contact with the inner surface of the perforated plate. In this invention, the hydrated gel polymer is pulverized by being extruded through the perforated plate. Where the produced particulate hydrated gel polymer is desired to comprise particles the size of which is uniform and small, the perforated plate provided with the cutter often, if not always, yields better results than the perforated plate not provided therewith.

For this invention, it is essential that the hydrated gel polymer should be heated to a temperature in the range of from 45° to 90° C., preferably from 50° to 70° C., preparatorily to the extrusion through the perforated plate. If the temperature of the hydrated gel polymer is less than 45° C. when it is extruded through the perforated plate, the hydrated gel polymer is exposed to unduly large shear force while in transit in the part of the device leading to the perforated plate and is consequently prevented from easily producing a particulate hydrated gel polymer having a high absorption ratio and a small water-soluble component as aimed at by this invention. Further, the productivity of the operation of extrusion is unduly low. Conversely, if the temperature exceeds 90° C., the physical properties of the hydrated gel polymer are degraded possibly to the extent of rendering it difficult to produce a particulate hydrated gel polymer having a high absorption ratio and a small water-soluble component. The energy which has been spent for elevating the temperature of the hydrated gel polymer to this unduly high level, therefore, fails to bring about a proportionate addition to the effect of the heating.

The method for producing the absorbent resin of this invention is characterized by drying the particulate hydrated gel polymer obtained by the method of production of this invention described above and then optionally disintegrating and/or pulverizing the dried particulate hydrated gel polymer.

In this invention, the drying can be effected by using any of the methods heretofore known to the art. The devices which are available for this drying include a box type drier, an aeration box type drier, an aeration band drier, a vertical aeration type drier, and a rotary type drier, for example.

Though the temperature to be used for drying the hydrated gel polymer needs not differ from the temperature prevalently used heretofore, it is generally in the range of from 80° to 250° C., preferably from 100° to 200° C. If this temperature exceeds 250° C., the polymer may possibly be deteriorated or decomposed. The time required for this drying is notably short as compared with the time required in the production of the hydrated gel polymer by the conventional method without reference to the particular type of method of drying to be adopted.

The method of this invention is embodied particularly preferably by following the method of drying disclosed in JP-A-64-26,604. Though this method is ideal for the production of a polymer having a low residual monomer content, it has a problem of poor efficiency of drying when the residual monomer content is to be amply lowered. By using the particulate hydrated gel polymer produced by the method of production of this invention, the efficiency of drying is notably improved and the absorbent resin which satisfies the requirements imposed by this invention, i.e. a high absorption ratio and a small water-soluble component, and possesses a notaly repressed residual monomer content can be obtained in a high yield.

In this invention, for the production of the particulate absorbent resin, any of the methods of pulverization heretofore known to the art can be adopted. The devices which can be effectively usable for the pulverization include high-speed rotary pulverizing devices (such as a pin mill and a hammer mill), screw mills (such as a coffee mill), and roll mills, for example. Since the dried particulate hydrated gel polymer which is obtained by the method of production of this invention is a uniformly dried product, the pulverization (disintegration) which is effected by the use of a roll mill among other devices cited above allows production of an absorbent resin having a small fine dust content without a step of removal of undried portion.

Optionally the absorbent resin which is obtained by the method of this invention may be subjected to a surface treatment by any of the methods heretofore known to the art. One of these known methods effects modification of the absorbent resin by mixing this absorbent resin with a crosslinking agent containing at least two functional groups capable of reacting with the functional group contained in the absorbent resin thereby inducing a reaction of the combined reactants and heightening the cross-link density in the surface region of the absorbent resin.

The absorbent resin which is obtained by the method of this invention or the absorbent resin which results from the surface treatment described above may be optionally agglomerated by any of the methods heretofore known to the art.

Now, this invention will be described more specifically below with reference to working examples and controls. It should be noted, howevers that the scope of this invention is not limited by these working examples.

The average particle diameters of the particulate hydrated gel polymers, the particle size distributions of the particulate hydrated gel polymers on dry basis, the particle size distributions of the dried and pulverized polymers, and the absorption ratios and water-soluble component contents of the dried and pulverized polymers indicated in these examples represent the magnitudes found by the following testing methods.

A. Average particle diameter of particulate hydraged gel polymer

A sample taken in a size of 25 g from a given particulate hydrated gel polymer (solids content $\alpha$ % by weight) was placed in 1,200 g of an aqueous 20 wt % sodium chloride solution and stirred therein for 60 minutes with a stirrer tip rotated at a rate of 300 rpm. The disperson resulting from the stirring was poured into superposed sieves (having mesh sizes of 9.5 mm, 2.0 mm, 0.85 mm, 0.60 mm, 0.30 mm, and 0.075 mm) and 6000 g of an aqueous 20 wt % sodium chloride solution was gently poured therein again to classify the hydrated gel polymer. The fractions of the hydrated gel polymer stopped on the sieves in consequence of the classification were thoroughly drained and weighed. Each sieve opening was reduced to a sieve opening, R ($\alpha$), corresponding to the solids content, $\alpha$ % by weight, of the hydrated gel polymer in accordance with the following numerical expression 1. The particle size distribution of the particulate hydrated gel polymer corresponding to the solids content, $\alpha$ % by weight, was plotted on a logarithmic probability chart. The particle diameter corresponding to 50% by weight on the chart was taken as the average particle diameter of the sample.

$$R(\alpha) \text{ (mm)} = \sqrt[3]{25 \text{ (g)}/W \text{ (g)}} \times \gamma \text{(mm)} \qquad (1)$$

wherein R ($\alpha$) is the sieve opening (mm) as reduced to the hydrated gel polymer having the solids content, $\alpha$ % by weight, w is the total weight (g) of the hydrated gel polymer resulting from the classification and draining, and $\gamma$ is the sieve opening (mm) used for classifying the hydrated gel polymer swelled with the aqueous 20% sodium chloride solution.

B. Particle size distribution of particulate hydrated gel polymer as reduced to a dry state A sample taken in a size of 25 g from a given hydrated gel polymer (solids content $\alpha$ % by weight) was placed in 1,200 g of an aqueous 20% sodium chloride solution and stirred therein for 60 minutes with a stirrer tip rotated at a rate of 300 rpm. The dispersant resulting from the stirring was poured into superposed sieves (having mesh sizes of 9.5 mm, 2.0 mm, 0.85 mm, 0.60 mm, 0.30 mm, and 0.075 mm) and 6000 g of an aqueous 20% sodium chloride solution was gently poured therein again to effect classification of the hydrated gel polymer. The fractions of the hydrated gel polymer stopped on the sieves in consequence of the classification were thoroughly drained and weighed. Each sieve opening was reduced to the sieve opening, R (100), corresponding to 100% by weight of the solids content of the hydrated gel polymer in accordance with the following numerical expression 2. The particle size distribution of the hydrated gel polymer on dry basis, corresponding to 100% by weight of the solids content was plotted on a logarithmic probability chart.

$$R(100) \text{ (mm)} = \sqrt[3]{\frac{\alpha}{100} \times \frac{25}{W}} \times \gamma \text{ (mm)} \qquad (2)$$

wherein R (100) is the sieve opening (mm) as reduced to the hydrated gel polymer having a solids content of 100%, w is the total weight (g) of the hydrated gel polymer resulting from classification and draining, and $\gamma$ is the sieve opening (mm) used for classifying the hydrated gel polymer swelled with an aqueous 20% sodium chloride solution.

C: Particle size distribution of dried and pulverized product

A sample taken in a size of 30 g from a given dried and pulverized hydrated gel polymer was poured into a pile formed of JIS standard sieves of 18.5 mesh, 30 mesh, 50 mesh, and 100 mesh and a receptacle plate and shaken as held in the pile on a sieve shaking device for 10 minutes. The fractions of the sample stopped on the sieves were weighed and their relative proportions were reported in % by weight.

D. Absorption ratio of dried and pulverized product

A sample accurately weighed out in a size of about 0.2 g from a given dried and pulverized hydrated gel polymer obtained by classification with JIS standard sieves of 10 mesh through 100 mesh was uniformly placed in a tea bag-like pouch of non-woven fabric (40 mm × 150 mm), left immersed in an aqueous 0.9% NaCl solution for 60 minutes, and then weighed. The absorption ratio of the sample was computed in accordance with the following numerical expression 3.

Absorption ratio (g/g) = (Weight after absorption (g) − blank (g))/Weight of dried pulverized product (g)

E. Water-soluble component content of dried and pulverized product

A sample taken in a size of 0.5 g from a given dried and pulverized hydrated gel polymer obtained by classification with JIS standard sieves of 10 mesh to 100 mesh was dispersed in 1,000 ml of deionized water and stirred therein for 16 hours. The resultant dispersion was passed through a filter paper (TOYO #6) to obtain at least 100 g of filtrate. Exact 100 g of the filtrate was charged into a rotary evaporator and concentrated to 2-3 ml. By using deionized water, concentrated filtrate was poured into a dish $\{W_o(g)\}$. It was dried up at 120° C. $\{W_1(g)\}$. The water-soluble component content was computed in accordance with the following numerical expression 4.

$$\text{Water-soluble component (wt \%)} = \frac{(W_1 - W_0) \times 1000}{0.5 \times 100} \times 100 \quad (4)$$

EXAMPLE 1

In a kneader of stainless steel having an inner volume of 10 liters and provided with a two-arm sigma blade and a thermometer, 5,500 g of an aqueous solution containing 38% by weight of a monomer component comprising 75 mol % of sodium acrylate and 25 mol % of acrylic acid and 3.49 g of trimethylolpropane triacrylate (0.05 mol % based on the monomer component) as a cross-linking agent were placed and nitrogen gas was blown to displace the entrapped internal gas of the reaction system. Then, the contents of the kneader were stirred by rotating the two kneader blades at a rate of 40 rpm and heated by circulating a hot water at 35° C. through the jacket and 2.8 g of sodium persulfate and 0.14 g of l-ascorbic acid as polymerization initiators were added thereto meanwhile. The monomer component began to polymerize three minutes after the addition of the polymerization initiators and the polymerization reached the peak temperature of 86° C. after the elapse of 15 minutes thence. The stirring was continued. After the elapse of 30 minutes following the start of the polymerization, there was obtained a particulate hydrated gel polymer (having an average particle diameter of 2.5 mm). About 12% by weight of the hydrated gel polymer obtained at this point consisted of particles of diameters exceeding 10 mm. The portion of the hydrated gel polymer having particle diameters exceeding 10 mm was determined by taking a sample of 500 g of the hydrated gel polymer, separating from this sample the particles found by visual observation to possess diameters exceeding 10 mm, and computing the ratio (% by weight) of the total amount of the separated particles to the size of sample, 500 g. Then, the produced hydrated gel polymer was kept at 68° C. and extruded through a perforated plate (opening ratio 35%) containing holes of a diameter of 12.5 mm by the use of a screw type extruding device (a chopper produced by Hiraga Kosakusho K.K.), to obtain a particulate hydrated gel polymer {hydrated gel (1)}. The content of particles of diameters exceeding 10 mm in the hydrated gel (1) was 0%. The speed of extrusion in this case was 360 kg/hr. In a cage of metallic net 200 mm × 280 mm × 80 mm, 1,000 g of this hydrated gel (1) was placed and dried with hot air supplied at 160° C. for 30 minutes from a batchwise aeration type drier (produced by Satake Kagakukikai Kogyo K.K.). The dried product was pulverized with a roll mill (produced by Asano Tekko K.K.) to obtain a dried pulverized product, i.e. absorbent resin powder (1), of 1.7-mm pass (determined by a JIS standard 10-mesh sieve). This hydrated gel (1) was tested for particle size distribution on dry basis, and absorbent resin powder (1) was tested for absorption ratio, water-soluble component content, and fine dust content (100-mesh pass). The results are shown in Table 1.

Control 1

A particulate hydrated gel polymer {hydrated gel (1a) for comparison} was obtained by a polymerization performed in the same manner as in Example 1. The content of particles of diameters exceeding 10 mm in the hydrated gel (1a) for comparison was 12%. When this hydrated gel (1a) for comparison was dried in the same manner as in Example 1, it was dried neither evenly nor wholly and could not be pulverized. It was dried additionally for 35 minutes to obtain a dried product, which was pulverized in the same manner as in Example 1 to obtain an absorbent resin powder (1a) for comparison. The hydrated gel (1a) for comparison and the absorbent resin powder (1a) for comparison were similarly evaluated in the same manner as in Example 1. The results are shown in Table 1.

EXAMPLE 2

A particulate hydrated gel polymer (having an average particle diameter of 0.8 mm) was obtained by following the procedure of Example 1, except that the operating speed of the kneader blades was changed to 45 rpm and the rotation of the kneader blades was continued for 30 minutes after the polymerization temperature had reached its peak and a hydrated gel (2) and an absorbent resin powder (2) were obtained by extruding the particulate hydrated gel polymer through a perforated plate and drying and pulverizing the extruded product in the same manner as in Example 1. The content of particles of diameters exceeding 10 mm in the hydrated gel (1) was 0%. The speed of extrusion was 360 kg/hr. The hydrated gel (2) and the absorbent resin powder (2) were evaluated in the same manner as in Example 1. The results are shown in Table 1.

EXAMPLE 3

A hydrated gel (3) and an absorbent resin powder (3) were obtained by following the procedure of Example 1, except that the particulate hydrated gel polymer was extruded through a perforated plate (having an opening ratio of 36%) containing holes of a diameter of 7.0 mm. The content of particles of diameters exceeding 10 mm in the hydrated gel (3) was 0%. The speed of extrusion was 300 kg/hr. The hydrated gel (3) and the absorbent resin powder (3) were evaluated in the same manner as in Example 1. The results are shown in Table 1.

EXAMPLE 4

A hydrated gel (4) and an absorbent resin powder (4) were obtained by following the procedure of Example 1, except that the particulate hydrated gel was extruded through a perforated plate containing holes of a diameter of 16 mm. The content of particles of diameters exceeding 10 mm in the hydrated gel (4) was 0.5%. The speed of extrusion was 370 kg/hr. The hydrated gel (4) and the absorbent resin powder (4) were evaluated in the same manner as in Example 1. The results are shown in Table 1.

EXAMPLE 5

A hydrated gel (5) and an absorbent resin powder (5) were obtained by following the procedure of Example 1, except that the temperature of the hydrated gel polymer was kept at 85° C. for the extrusion. The content of particles of diameters exceeding 10 mm in the hydrated gel (5) was 0%. The speed of extrusion was 360 kg/hr. The hydrated gel (5) and the absorbent resin powder (5) were evaluated in the same manner as in Example 1. The results are shown in Table 1.

EXAMPLE 6

Figure 2:
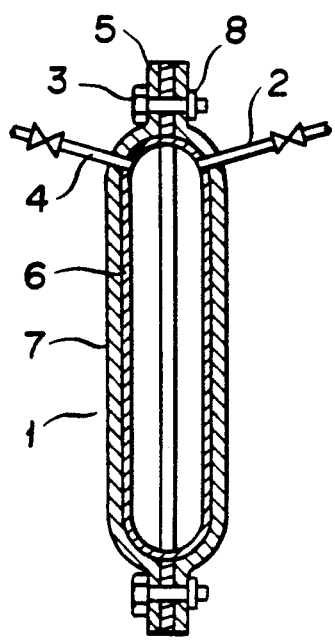
FIG. 2 is a cross section taken through FIG. 1 along the line II—II.

A stationary type polymerization apparatus (having an inner volume of 4.5 liters and measuring 300 mm in height, 300 mm in length, and 50 mm in width) 1 was constructed, as illustrated in FIG. 1 and FIG. 2, by interposing a rubber packing between two opposed stainless steel plates 7 lined with a coating of fluorine resin, tightly sealing them with bolts 3 and nuts 8, and displacing the entrapped inner gas with nitrogen. Into this polymerization apparatus 1, 4,000 g of an aqueous solution containing 30% by weight of a monomer component comprising 75 mol % of sodium acrylate and 25 mol % of acrylic acid, 2.0 g of trimethylolpropane triacrylate (0.05 mol % based on the monomer component) as a cross-linking agent, 0.27 g of sodium persulfate, and 0.14 g of sodium hydrogen sulfite were introduced through a raw material inlet port 2. In the meantime, the nitrogen was discharged through an air outlet port 4. This stationary type polymerization apparatus was immersed in a water bath provided with a stirrer and a temperature controller. The temperature of the water bath was maintained at 30° C. to effect continued elimination of the heat of reaction while the ensuing polymerization was in process. After the elapse of two hours following the start of the polymerization, lumps of hydrated gel polymer were extracted from the polymerization apparatus. The hydrated gel polymer was extruded through a perforated plate, dried, and pulverized in the same manner as in Example 1, to obtain a hydrated gel (6) and an absorbent resin powder (6). The content of particles of diameters exceeding 10 mm in the hydraged gel (6) was 1%. The speed of extrusion was 360 kg/hr. The hydrated gel (6) and the absorbent resin powder (6) were evaluated in the same manner as in Example 1. The results are shown in Table 1.

EXAMPLE 7

In a kneader similar to that of Example 1, 5,500 g of an aqueous solution containing 37% by weight of a monomer component comprising 70 mol % of sodium acrylate, 20 mol % of acrylic acid, and 10 mol % of 2-acrylamide-2-methylpropane sulfonic acid and 2.98 g of trimethylolpropane triacrylate (0.05 mol % based on the monomer component) as a crosslinking agent were placed and nitrogen gas was introduced to displace the entrapped inner gas from the reaction system. The contents of the kneader, in the presence of 2.42 g of sodium persulfate and 0.12 g of C-ascorbic acid added thereto as polymerization initiators, were polymerized in the same manner as in Example 1, to produce a particulate hydrated gel polymer having an average particle diameter of 3 mm. From the particulate hydrated gel polymer, a hydrated gel (7) and an absorbent resin powder (7) were produced by following the procedure of Example 1, excepting the particulate hydrated gel polymer was extruded through a perforated plate containing holes of a diameter of 7 mm by the use of an agglomeration device (produced by Fuji Powder K.K. and marketed under trademark designation of "Pelletter Double EXDFS-60"). The content of particles of diameters exceeding 10 mm in the hydrated gel (7) was 0%. The speed of extrusion was 320 kg/hr. The hydrated gel (7) and the absorbent resin powder (7) were evaluated in the same manner as in Example 1. The results are shown in Table 1.

Control 2

Lumps of hydrated gel polymer were obtained by following the procedure of Example 6, except that the use of trimethylolpropane triacrylate as a cross-linking agent was omitted. The lumps of hydrated gel polymer which had no cross-linked structure showed so high viscosity that when they were extruded through a screw type extruding device, they gave rise to cords of hydrated gel polymer and failed to produce a particulate hydrated gel polymer.

Control 3

The procedure of Example 1 was repeated, except that the particulate hydrated gel polymer was extruded through a perforated plate containing holes of a diameter of 3.2 mm. When the produced hydrated gel was extruded by the use of a screw type extruding device, it only gave rise to cords of pclymer and failed to produce a particulate hydrated gel polymer. The speed of extrusion was 150 kg/hr. From the cords of polymer, an absorbent resin powder (3a) for comparison was obtained by following the procedure of Example 1, except that the time of drying was changed to 40 minutes. The absorbent resin powder (3a) for comparison was evaluated in the same manner as in Example 1 . The results are shown in Table 1.

Control 4

A hydrated gel (4a) for comparison was obtained by following the procedure of Example 1, except that the particulate hydrated gel polymer was extruded through a perforated plate containing holes of a diameter of 20 mm. The content of particles of diameters exceeding 10 mm in the hydrated gel (4a) for comparison was 9%. The speed of extrusion was 360 kg/hr. When the hydrated gel (4a) for comparison was dried in the same manner as in Example 1, the gel was dried neither evenly nor wholly and, therefore, could not be pulverized. It was further dried additionally for 30 minutes to obtain a dry product. From this dry product, an absorbent resin powder (4a) for comparison was obtained by following the procedure of Example 1. The hydrated gel (4a) for comparison and the absorbent resin powder (4a) for comparison were evaluated in the same manner as in Example 1. The results are shown in Table 1.

Control 5

The procedure of Example 3 was repeated, except that the temperature of the hydrated gel polymer was kept at 40° C. for the extrusion. The hydrated gel polymer had such high viscosity that when it was extruded by the use of a screw type extruding device, it gave rise to cords of polymer and failed to produce a particulate hydrated gel. The speed of extrusion was 240 kg/hr. From the cords of polymer, an absorbent resin powder (5a) for comparison was obtained by following the procedure of Control 3. The absorbent resin powder (5a) for comparison was evaluated in the same manner as in Example 1. The results are shown in Table 1.

Control 6

A hydrated gel (6a) for comparison and an absorbent resin powder (6a) for comparison were obtained by following the procedure of Example 3, except that the temperature of the hydrated gel polymer was maintained at 95° C. for the extrusion. The content of particles of diameters exceeding 10 mm in the hydrated gel (6a) was 0%. The speed of extrusion was 300 kg/hr. The hydrated gel (6a) for comparison and the absorbent resin powder (6a) for comparison were evaluated in the same manner as in Example 1. The results are shown in Table 1.

product, i.e. an absorbent resin powder (8), was obtained by pulverizing the dried product with a roll mill. The absorbent resin powder (8) was found to have a residual monomer content of 50 ppm. The absorptive capacity was 47 g/g and the water-soluble component content was 10%. The residual monomer content was determined by the following method.

A sample taken in a size of 0.50 g from the dried and pulverized product resulting from classification through a pile of JIS standard sieves of 10 mesh to 100 mesh was dispersed in 1,000 ml of deionized water, stirred for two hours, passed through a Watman filter paper GF/F (having a particle retaining capacity of 0.7 micron), and subjected to liquid chromatography.

EXAMPLE 9

The procedure of Example 8 was repeated, except that the hydrated gel (6) obtained in Example 6 was used instead. Since part of the hydrated gel remained wet after 40 minutes of drying, the drying was continued additionally for 10 minutes. From the dried product, an absorbent resin powder (9) was obtained in the same manner as in Example 8. The absorbent resin powder (9) was found to have a residual monomer content of 50 ppm, an absorption ratio of 47 g/g, and a water-soluble component content of 10%.

Control 7

The procedure of Example 8 was repeated, except

TABLE 1

| | Absorbent resin powder | | | Hydrated gel polymer | | | | | |
| | Absorption ratio | Water-soluble component | Amount of fine powder | Amount of large size gel*1 | Particle size distribution as reduced to a dry state*2 (wt %) | | | | |
| | g/g | wt % | wt % | wt % | 4.7 on | 4.7/18.5 | 18.5/50 | 50/100 | 100 PASS |
| --- | --- | --- | --- | --- | --- | --- | --- | --- | --- |
| Example 1 | 48 | 9 | 2 | 0 | 2 | 50 | 33 | 8 | 7 |
| Example 2 | 48 | 9.5 | 3 | 0 | 1 | 48 | 37 | 7 | 6 |
| Example 3 | 49 | 10 | 2 | 0 | 0 | 29 | 45 | 16 | 10 |
| Example 4 | 47 | 9 | 2 | 0.5 | 3 | 52 | 38 | 3 | 4 |
| Example 5 | 48 | 11 | 2 | 0 | 2 | 48 | 35 | 8 | 7 |
| Example 6 | 47 | 8 | 4 | 1 | 9 | 51 | 30 | 4 | 6 |
| Example 7 | 49 | 10 | 3 | 0 | 0 | 30 | 42 | 17 | 11 |
| Control 1 | 43 | 9 | 6 | 12 | 20 | 64 | 13 | 1 | 2 |
| Control 3 | 49 | 16 | 9 | string shape | | | | | |
| Control 4 | 44 | 9 | 6 | 9 | 17 | 51 | 26 | 3 | 3 |
| Control 5 | 49 | 15 | 8 | string shape | | | | | |
| Control 6 | 48 | 14 | 8 | 0 | 0 | 32 | 41 | 16 | 11 |

*1 Hydrated gel polymer having not less than 10 mm of particle size
*2 Expressed by openings of JIS standard sieve

EXAMPLE 8

Figure 3:
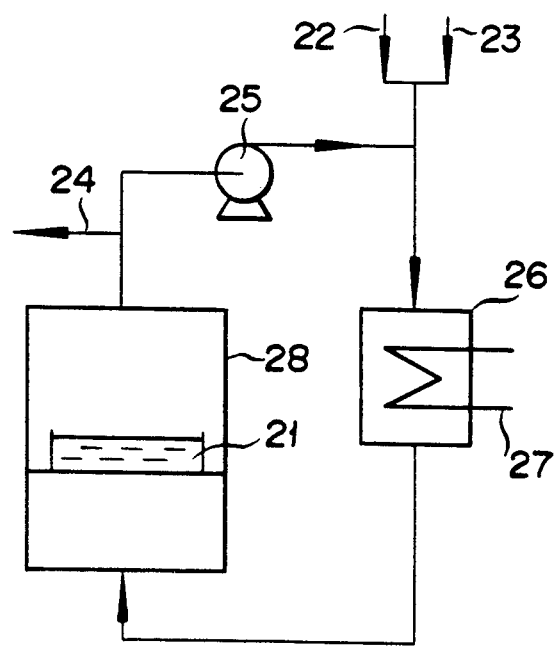
FIG. 3 is a flow sheet of a drying device used in examples.

In a cage of metallic net measuring 200 mm×280 mm×80 mm, 0.75 kg of the hydrated gel (1) obtained in Example 1 was placed and dried with hot air supplied from a drying device shown in FIG. 3. The hydrated gel (1) was placed in a hot air drying device 28 as contained in the cage and dried till a water content of 8% by exposure to a hot current of steam-air mixture of a temperature of 110° C. and a dew point of 85° C. produced by introducing fresh air and steam respectively through a fresh air inlet tube 22 and a steam inlet tube 23 into a heat exchanger 26 and heating the resultant mixture of flesh air and steam with a thermal medium introduced through a thermal medium inlet tube 27 and blown at a rate of 1 m/sec against the cage. Thus, a dried product was obtained. Part of the steam-air mixture was discharged through a discharge tube 24 and circulated by a blower 25 to the heat exchanger 26. The drying was continued for 40 minutes. A 1.7-mm pass (JIS standard sieve 10-mesh pass) dried and pulverized that the hydrated gel (1a) for comparison obtained in Control 1 was used instead. This hydrated gel remained undried after 40 minutes of drying. Even after the drying was additionally continued for 10 minutes, it contained wet part and it could not be pulverized.

What is claimed is:

1. A method for the production of a particulate hydrated gel polymer, which comprises:
   polymerizing a monomer composition (1) containing at least one monomer (A) selected from the group consisting of (meth)acrylic acids, alkali metal salts of (meth)acrylic acids, ammonium salts of (meth)acrylic acids, and (meth)acrylamides as main component and a cross-linkable monomer (B) having at least two polymerizable double bonds in the molecular unit in an amount of from 0.01 to 10 mol %, based on said monomer composition (1);
   heating the resultant hydrated gel polymer having a cross-linked structure to a temperature in the range of from 45° to 90° C., and extruding the resultant hot hydrated gel polymer through a perforated plate containing holes of a diameter in the range of from 6.5 to 18 mm.

2. A method according to claim 1, wherein said hydrated gel polymer is a particulate hydrated gel polymer having an average particle diameter in the range of from 0.5 to 3 mm.

3. A method according to claim 1, wherein the temperature of said heating of said hydrated gel polymer is in the range of from 50° to 70° C.

4. A method according to claim 1, wherein said hydrated gel polymer has a water content in the range of from 40 to 90% by weight.

5. A method according to claim 1, wherein said hydrated gel polymer has a water contant in the range of from 50 to 80% by weight.

6. A method according to claim 1, wherein said perforated plate has an opening ratio of not less than 25%.

7. A method according to claim 1, wherein said perforated plate has an opening ratio in the range of from 30 to 90%.

8. A method according to claim 1, wherein said perforated plate contains holes of a diameter in the range of from 8 to 15 mm.

9. A method for the production of an absorbent resin, which comprises:
polymerizing a monomer composition (1) containing at least one monomer (A) selected from the group consisting of (meth)acrylic acids, alkali metal salts of (meth)acrylic acids, ammonium salts of (meth)acrylic acids, and (meth)acrylamides as main component and a cross-linkable monomer (B) having at least two polymerizable double bonds in the molecular unit in an amount of from 0.01 to 10 mol %, based on said monomer composition (1);
heating the resultant hydrated gel polymer having a cross-linked structure to a temperature in the range of from 45° to 90° C.;
extruding the resultant hot hydrated gel polymer through a perforated plate containing holes of a diameter in the range of from 6.5 to 18 mm thereby obtaining a particulate hydrated gel polymer; and
drying said particulate hydrated gel polymer.

10. A method according to claim 9, wherein said drying of said particulate hydrated gel polymer is effected by exposure to a gas containing at least steam wherein said gas has a dew point of from 50° to 100° C. and a temperature of from 80° to 250° C.

11. A method according to claim 9, wherein said hydrated gel polymer is a particulate hydrated gel polymer having an average particle diameter in the range of from 0.5 to 3 mm.

12. A method according to claim 9, wherein said perforated plate has an opening ratio of at least 25%.

13. A method according to claim 9, which further comprises disintegrating or pulverizing the dried particulate hydrated gel polymer.

14. A method according to claim 13, wherein said disintegration or pulverization is carried out with a roll mill.

* * * * *